Jan. 24, 1967  J. F. HERNICK  3,300,353
BRAKE SHOES
Original Filed May 11, 1961
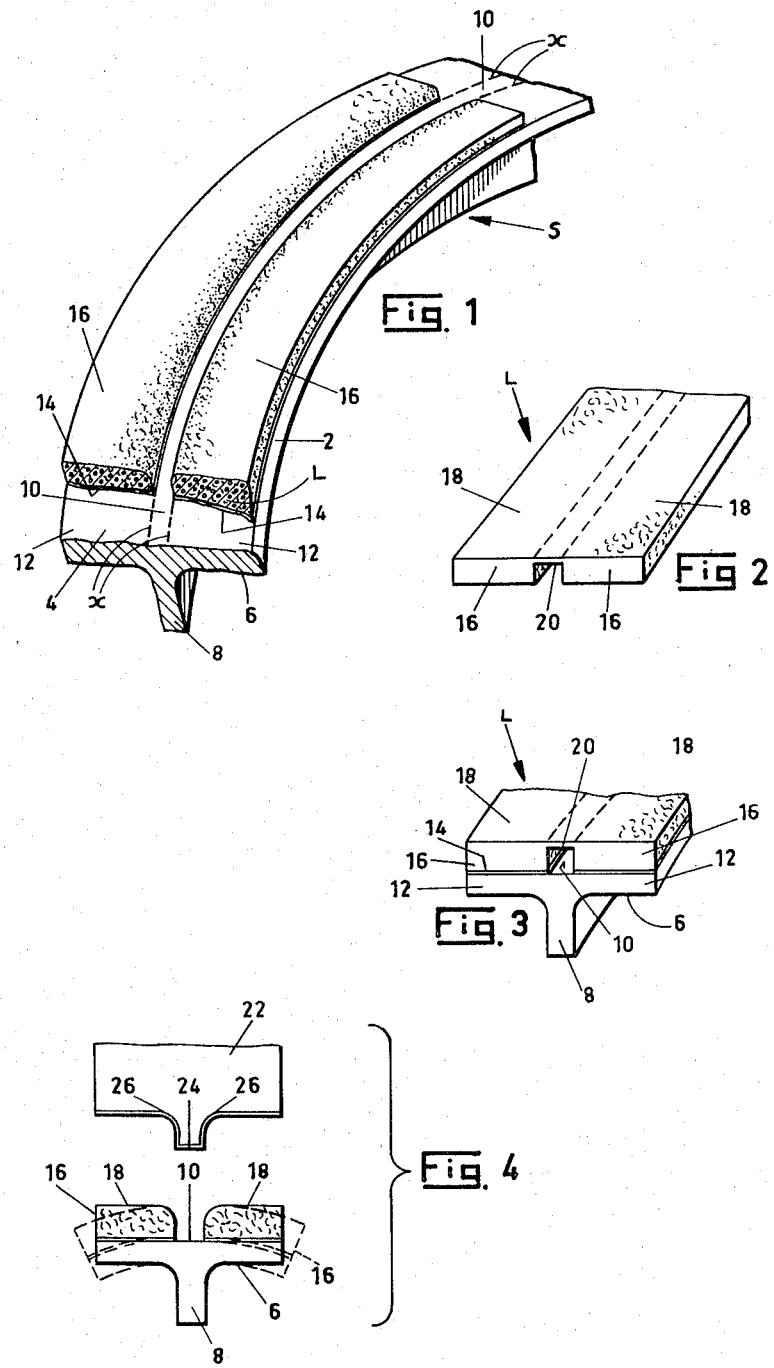
INVENTOR.
J. F. HERNICK
BY Leon Arthurs
Agent United States Patent Office 3,300,353
Patented Jan. 24, 1967

3,300,353
BRAKE SHOES
Jack F. Hernick, 6 Carousel Court, Toronto,
Ontario, Canada
Continuation of application Ser. No. 109,368, May 11,
1961. This application Feb. 10, 1964, Ser. No. 343,897
6 Claims. (Cl. 156—154)

This application is a continuation of my application Serial No. 109,368 for Brake Shoes, filed May 11, 1961 now abandoned.

The invention relates to brake shoes of the type which, in this example, are arranged to frictionally inter-engage with the interior wall of a rotating drum for the purpose of arresting rotation of the drum as well as of any other devices which may be connected or otherwise co-rotatorily associated therewith.

A brake shoe of the type visualized may be comprised of a pressure plate, lined as hereinafter described having an anvil member attached thereto and projecting from its back; the parts being arranged with pressure plate crossing the anvil and overhanging each side thereof providing a cross-sectional profile which is more or less T-shaped. Said anvil has several utilities including the transmission of pressure to the pressure plate as well as the provision of installation facilities for the latter.

To arrest rotation of the drum, said anvil is employed much as a lever or pusher for thrusting the pressure plate toward the drum so that the lined braking surface of the latter will forcibly engage and frictionally restrain the drum. The engagement of the pressure plate with the drum may be effected with considerable force in which event the lateral margins of the pressure plate overhanging the anvil have consequently been known to yield in reaction to such force and to deflect away from the drum.

Otherwise stated, the anvil is attached to the pressure plate along a narrow, linear zone which is co-incident with an axis of the pressure plate and which is stiffened and reinforced by such attachment. It will be observed that this relatively narrow zone receives the thrust from the anvil and distributes it to the pressure plate for engaging the drum aforesaid. Lacking independent re-inforcement or support, said lateral pressure plate margins are inclined to react and to deflect under re-active thrust of the drum and to arch about the anvil.

The braking surface of the pressure plate is usually lined with friction material, generally referred to as friction lining or brake lining. Normally, this material is not stretchable, and, in fact, has only limited flexibility leaving it somewhat brittle and prone to crack when pronouncedly flexed. If and when the pressure plate deflects about the anvil as above indicated, the lining becomes stressed and strained and often splits; being resultantly predisposed to—and actually suffering—premature failure. That is to say, the splitting of the lining is believed to render it particularly vulnerable to the destructive effects of friction and so to hasten its collapse.

It need hardly be stated that, all other things being equal, the wider the pressure plate, and, hence, its lateral margins, the greater is the susceptibility of its lining to premature destruction in view of the enhanced leverage and, hence, decreased resistance to deflecting pressures; such decreased resistance being characteristic of the lateral margins of widened pressure plates.

A main object of the invention is, therefore, to provide a process of lining a brake shoe of the character above described which yields a brake shoe comprising an anvil and a pressure plate having a lining which will not be strained by deflection of the pressure plate in normal use.

It will be obvious that the efficiency of a brake increases with the area of its braking surfaces which may in turn be increased, of course, by widening the drum and pressure plate. A collateral object of the invention is, therefore, to provide a process of lining a brake shoe which will conduce to more efficient brakes by permitting the employment of relatively wide pressure plates without unduly endangering the lining carried thereby.

A still further object of the invention is to provide a process of lining a brake shoe of the character described producing a brake shoe having a brake lining which is capable of yielding and accommodating itself to the deflection of the lateral margins of the pressure plate on which it is carried whereby to avoid strain and splitting.

The invention still further seeks to provide a process for equipping brake shoes with divided linings.

More specifically the process of the invention seeks to provide a brake shoe having a lining which is divided into at least two collateral discrete and disconnected bands; one such band being disposed on each side of the said linear zone at which the pressure plate is joined by the said anvil.

It is also an object of the invention to provide a process of lining a brake shoe which yields a brake shoe having a lining formed of multiple bands as aforesaid which are spaced apart not only to avoid the effects of deflection above noted but also for other advantageous purposes such as, for example, improved heat dissipation and water shedding characteristics.

Further and other objects of the invention more or less broad than the foregoing will be, in part obvious and, in part, specifically identified in the hereinafter following description of the elements, parts and principles constituting the invention of which a preferred embodiment is herein described and is illustrated in the annexed drawing by way of example only; like reference devices being used to refer to like parts of the invention throughout the several views of the said drawing wherein:

FIG. 1 is an isometric view of a portion of a brake shoe constructed pursuant to the invention;

FIG. 2 is an isometric view of a length of brake lining as contemplated by the invention;

FIG. 3 is an isometric view of a detail comprising the end of the brake shoe of FIG. 1 at a preliminary stage in the construction thereof; and FIG. 4 is an end elevational view of the detail of FIG. 3 at a subsequent stage of manufacture; the tool utilized in such manufacture being also included in the view.

The aforesaid objectives of the invention are achieved by a process wherein the pressure plate of a brake shoe is lined with at least two bands which are disconnected and separated from each other; being disposed on the pressure plate so that one of them lies on each side of the stiffened and re-inforced linear zone marking the juncture of the pressure plate and the anvil.

The invention contemplates multiband lining stock comprised of multiple spaced bands and fillets interconnecting said bands superficially—i.e. by their tops. A said multiband lining may be secured to the pressure plate of a brake shoe by any conventional means with its top or outer surface exposed for engagement with a brake drum and with the said stiffened linear zone of the pressure plate centered in the space between two neighbouring and connected bands. According to custom, said top surface of the lining will then be ground to "true" and otherwise finish the brake shoe by which process the connecting fillet will be erased thus leaving the bands secured to the pressure plate in the discrete, disconnected and separated form hereinbefore noted.

Referring now in greater detail to the drawing, the brake shoe S will be seen to be comprised of an elongated pressure plate 2 which is arched in this example, to present convex and concave surfaces respectively constituting its face 4 and back 6. The anvil 8 is rooted on back 6 of pressure plate 2 to extend radially from an intermediate longitudinal axis thereof substantially as shown in the drawing. The specific mode of joining the anvil 8 to back 6 is not of particular consequence to the invention so long as their juncture is sufficiently rigid to stiffen and re-inforce a narrow linear zone 10—bonded by dotted lines X—(FIG. 1), of the pressure plate 2 at the said juncture.

As has already been indicated and as the drawing reveals, the structure comprised of pressure plate 2 and anvil 8 is T-shaped in cross-section with the lateral margins 12—12 of pressure plate 2 on the respective sides of said linear zone 10 correspondingly overhanging the anvil 8.

The integral relationship of pressure plate 2 and anvil 8 in the drawing is merely illustrative of the arrangement of these parts in the present embodiment and is not intended to indicate a preferred structure. It will nevertheless be apparent from this view that in the illustrated arrangement of the parts, said anvil 8—and hence also said linear zone 10 which it stiffens—constitute a fulcrum about which said lateral margins 12—12 are deflectible as suggested exemplarily by the dotted lines in FIG. 4.

The brake material L of FIG. 2 lining pressure plate 2 may be secured thereto by any conventional method which may be appropriate to the present brake shoe S; it being bonded thereto at its inner surface in the present embodiment by adhesive film 14.

At this point, it is deemed appropriate to dwell briefly on some characteristics of brake lining generally bearing on that specifically contemplated by the present invention.

One currently popular method of making brake lining is by extrusion. In the exercise of this method, the component substances of the lining are first mixed to blend them and to achieve random distribution thereof throughout the mixture; the resulting, more or less hot and viscous, mixture being then forced through extrusion nozzles at relatively high pressures in a well-known manner. When the extrusion cools, its superficial layers appear to form a shell or a "skin" over and about the core layers thereof; the core layers being those which are believed to disintegrate upon exposure and on use.

A popular ingredient of modern brake lining is asbestos or like fibres which assume a more or less rectilinear orientation in the brake lining substantially parallel to the axis thereof which is, of course the axis of extrusion.

However, irrespective of their precise orientation or the reasons for such orientation, said fibres are wholly contained and confined within the "skin" of the brake lining; producing a structure which, for present purposes, may be defined as "integral" in the sense that it is unified and whole and unbroken in much the same manner as a raw egg in the shell remains integral until the shell is broken or cracked.

While the foregoing is submitted only as currently popular theory and not as a statement of the invention, injured brake linings are actually known to be highly prone to premature destruction whether for the foregoing or other reasons.

Some attempts have been made in the past to obviate the consequences attendant upon deflection of lateral margins 12—12 of prior brake shoes S by cutting the brake lining after its installation on the brake shoe but this expedient has failed to achieve the desired results.

That is to say, a distinct advantage is believed to be available by dividing the lining over the stiffened linear zone 10 so that it will not be strained by deflection of the lateral pressure plate margins 12—12. Conversely, if the division is effected by cutting through the core of the lining, the disadvantages resultantly accruing to the lining from the disruption of its solidarity are believed to far outweigh the advantages of division.

The invention therefore contemplates a lining L formed of at least two integral bands 16—16 which are united to pressure plate 2 on the respective sides of zone 10 in axially parallel, and co-planar relation; the channel 17 relieving lining L and separating bands 16—16 registering with zone 10.

To obtain this desired result, the invention contemplates integral, molded lining stock comprising the exemplary multiband lining L of FIG. 2 having at least two integral bands 16—16 connected preferably superficially at their tops 18—18 by a fillet 20 formed as a longitudinal strip integral therewith; said fillet 20 having only a fraction of the thickness of the respective bands 16—16, being merely required to retain said bands 16—16 in the aforesaid spaced and parallel relation while they are being installed on pressure plate 2 or are otherwise handled. If required by manufacturing considerations the lining L may be molded to dispose fillet 20 at any convenient level between the inner and outer surfaces thereof.

The respective bands 16—16 of said multiband lining L of FIG. 2 are secured to said pressure plate 2 at their inner surfaces by adhesive 14 for example, as in FIG. 3; the band tops 18—18 and fillet 20 being uppermost on the brake shoe S and the linear zone 10 being centered between bands 16—16, so that the fillet is raised above the pressure plate.

The width of said multiband lining L being scaled to the requirements of pressure plate 2, the correct orientation thereof is all that is required to produce the optimum positioning—and spacing—of bands 16—16 on pressure plate 2.

It will be seen that at this stage the pressure plate has a lining relieved or longitudinally channelled between its inner surface and a level closely adjacent to its outer surface, the relieved or channelled portion being in register with the zone 10 of the pressure plate.

Once secured to pressure plate 2, said multiband lining L is then subjected to a finishing and trueing operation whereby the band tops 18—18 are trimmed or ground down and the fillet 20 co-incidentally eroded as by cutter 22 of FIG. 4 to leave discrete and disconnected integral bands 16—16 bonded to the brake shoe S; said cutter 22 having a projecting tip 24 for ensuring total removal of fillet 20.

Said tip 24 may merge with the main portion of cutter 22 at sharpened curvatures 26—26 for arching the cut upper corner 28 of each band 16; said arched corners 28 being believed to be advantageous from several viewpoints, namely, for example, in smoothing out the cut surface of each band 16 and also in preventing damage thereto which might result from ridges formed on the drum (not shown) with which the instant brake shoe S co-operates.

It is deemed appropriate at this point to make some comment on certain questions which may occur to a reader of the foregoing submission.

That is to say, it has been indicated on the one hand that cutting through a brake lining to divide it into discrete halves has a deleterious effect thereon whereas, conversely, the cutting of the present fillet 20 has no such effect.

This contention is based on careful examination of a great many brake shoes and is submitted as a factual empirical finding. There is a theory, however, that prior brake linings only deteriorated when they were cut or broken to their cores whereas the present fillet 20 does not extend to the core and the present lining L requires therefore only a very shallow superficial cut to separate brake bands 16—16. Moreover, it will be recalled that the superficies or surface 18 of each band 16 is also cut or planed to true it and that this does not lead to premature destruction.

Upon this principle, it is conceivable that the fillet 20 need not be actually cut away but that it may instead be allowed to wear away or even to split in use in which event it may be quite immaterial whether the fillet 20 is disposed at the top or bottom of lining L.

Nevertheless, the views thus expressed are made only tentatively in an effort to explain the efficiency of the invention which, as has been said, has already been adequately proven empirically.

It is also believed to be noteworthy that the invention is principally applicable to brake shoes employing bands instead of blocks to line the pressure plate.

It will be obvious that the heretofore described selected embodiment of the invention may be modified in a variety of ways. The failure to deal with such modifications in this submission should not, in the result, be construed as an abandonment thereof; the intention being to reserve the right to every modification falling within fair construction of the claims now following.

What I claim is:

1. In the process of lining a brake shoe having a pressure plate with a defined axial zone the steps of:

Securing to said pressure plate a friction lining with an outer frictional surface for engagement with a brake drum and an inner surface by which it is secured to said pressure plate;

Said lining having a relieved portion in register with said axial zone and extending from said inner surface to a level between said inner and outer surfaces, and Separating said friction lining into two parts by the removal of a longitudinal strip thereof overlying said relieved portion after the lining is secured to said pressure plate.

2. In the process of lining a brake shoe having a pressure plate the steps of:

Securing to said pressure plate an integral, molded lining including parallel spaced bands interconnected by a thin fillet raised above said pressure plate, and Removing said fillet to disconnect said bands after the lining is secured to said pressure plate.

3. In the process of lining a brake shoe having a pressure plate the steps of:

Securing to said pressure plate a friction lining with an outer frictional surface for engagement with a brake drum and an inner surface by which it is secured to said pressure plate;

Said lining being longitudinally channelled between its inner surface and a level closely adjacent to its outer surface defining a pair of spaced parallel bands connected by a thin fillet at their outer surfaces, and Removing said fillet to disconnect said bands after the lining is secured to the pressure plate.

4. A process as claimed in claim 3 including the step of registering the longitudinal channel in said lining with a defined axial zone of said pressure plate.

5. A process as claimed in claim 3 including the step of trimming said friction lining to true the bands and simultaneously, to remove said fillet.

6. A process as claimed in claim 3 including the step of trimming said friction lining to true the bands, to remove said fillet and to form rounded corners on said bands.

References Cited by the Examiner

UNITED STATES PATENTS 2,840,196   6/1958   Lignian _____ 188—250

EARL M. BERGERT, *Primary Examiner.*

DOUGLAS J. DRUMMOND, *Examiner.*